United States Patent [19]

Kikuchi

[11] Patent Number: 5,585,943
[45] Date of Patent: Dec. 17, 1996

[54] COMPLEX RECORDING APPARATUS

[75] Inventor: Naoyuki Kikuchi, Gifu, Japan

[73] Assignee: Sanyo Electric Co., Ltd., Osaka, Japan

[21] Appl. No.: 333,543

[22] Filed: Nov. 2, 1994

[30] Foreign Application Priority Data

Nov. 4, 1993 [JP] Japan .................. 5-275404

[51] Int. Cl.⁶ .............. H04N 1/04; H04N 1/21; G03G 21/00; B65H 3/44
[52] U.S. Cl. ........... 358/498; 355/308; 355/309; 355/313; 355/202; 355/496; 355/296; 271/9.09
[58] Field of Search ................. 358/496, 498, 358/296; 355/309, 313, 202, 308; 347/215, 218, 3, 262, 264; 346/134; 271/9.09; H04N 1/04, 1/21, 1/23; G03G 21/00; B65H 3/44, 5/26

[56] References Cited

U.S. PATENT DOCUMENTS

| | | | |
|---|---|---|---|
| 4,649,403 | 3/1987 | Miura | 364/160 |
| 4,786,920 | 11/1988 | Igarashi | 271/9 |
| 4,794,419 | 12/1988 | Shibazaki et al. | 355/309 |
| 4,998,216 | 3/1991 | Hino et al. | 271/9 |
| 5,159,387 | 10/1992 | Takahashi et al. | 355/309 |
| 5,208,902 | 5/1993 | Kumon | 355/311 |

*Primary Examiner*—Kim Yen Vu
*Assistant Examiner*—Kimberly A. Williams
*Attorney, Agent, or Firm*—Darby & Darby, P.C.

[57] ABSTRACT

A complex recording apparatus includes a housing. A platen glass is provided at an upper portion of the housing, and an analog optical system which reads a copy original put on the platen glass is provided within the housing. Furthermore, above the housing, a platen cover which holds the copy original put on the platen glass and a digital optical system which reads a facsimile original supplied from an outside are independently provided. When a paper is manually inserted into a manual paper insertion port formed on a side surface of the housing, a paper sensor is turned-on. In receiving facsimile image data, if the paper sensor is turned-on, the facsimile image data is written in a RAM, and if the paper sensor is not turned-on, an image forming unit performs an image forming operation according to the facsimile image data read from the RAM.

8 Claims, 7 Drawing Sheets

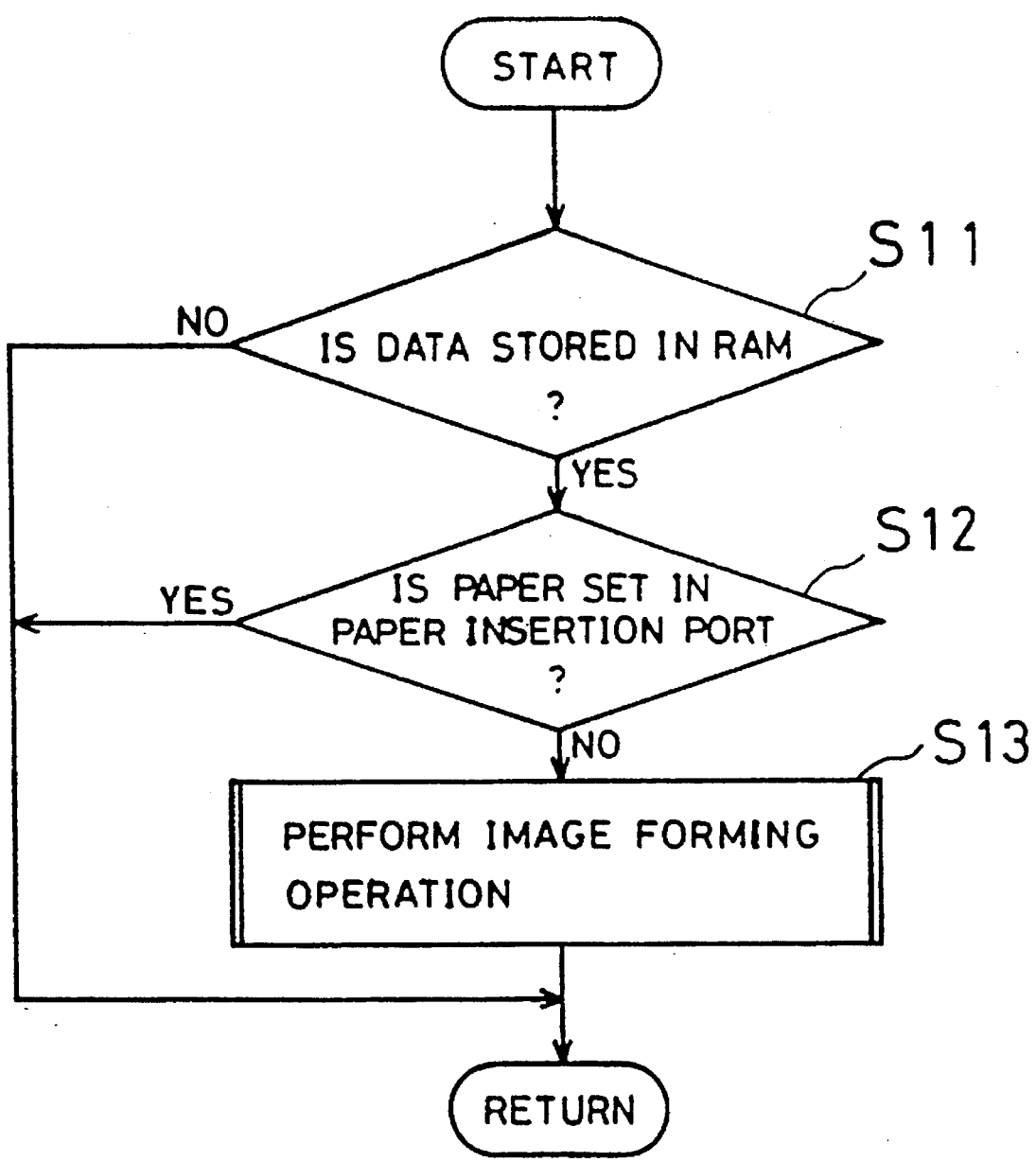

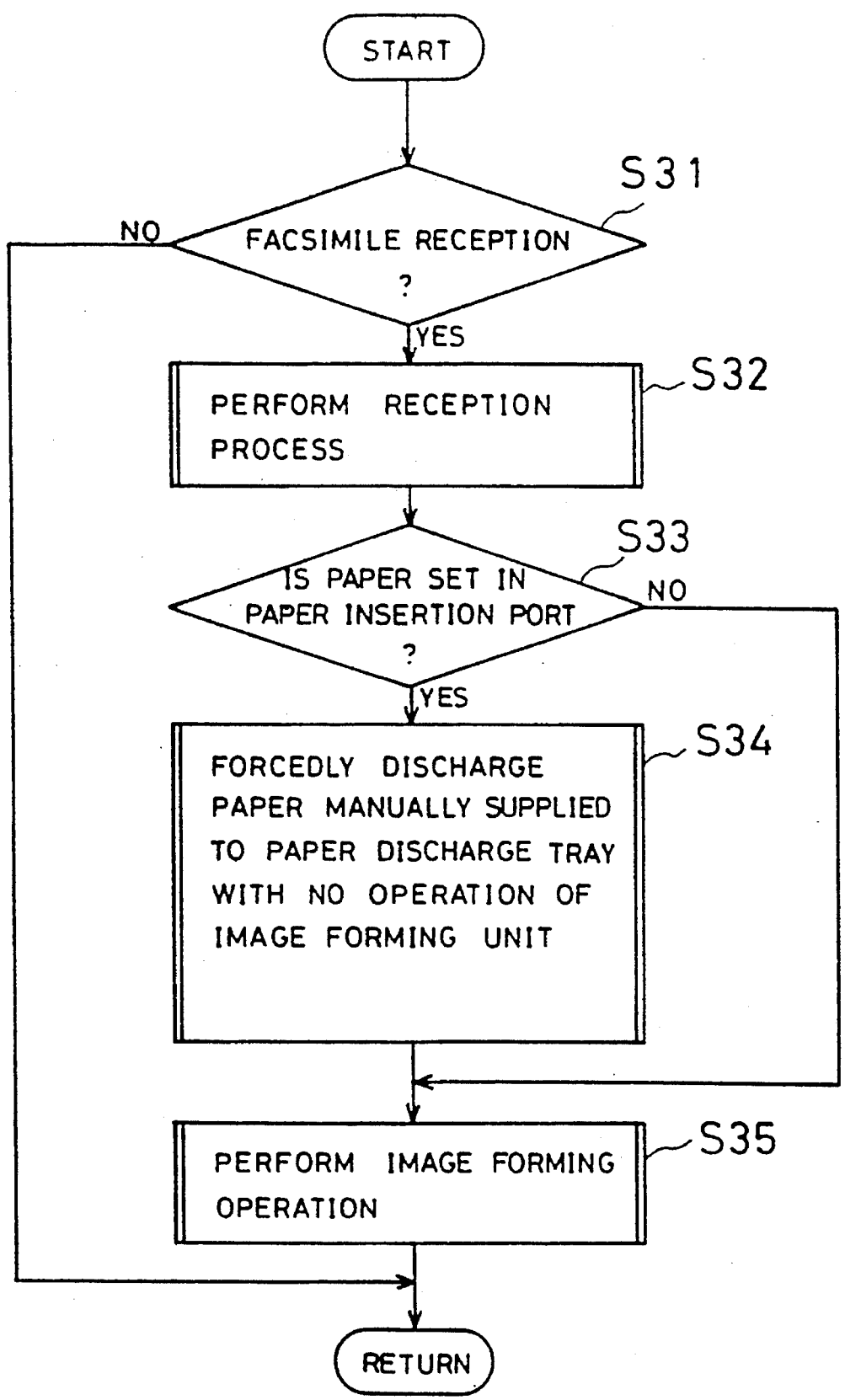

COMPLEX RECORDING APPARATUS

BACKGROUND OF THE INVENTION

1. Field of the Invention

The present invention generally relates to a complex recording apparatus. More specifically, the present invention relates to a complex recording apparatus which has both of a copy machine function and a facsimile machine function, and further a manual paper insertion port.

2. Description of the Prior Art

In a conventional complex recording apparatus of this type, in general, a facsimile original reading portion is provided on a side surface of an apparatus body or on a platen cover which holds an original for an analog copy. Therefore, in the prior art apparatus, there was a problem that an apparatus becomes large, and thus, it is impossible to make the apparatus compact and lightweight.

Then, the assignee of the present invention has proposed a novel complex recording apparatus being made compact and lightweight in copending U.S. Ser. No. 08/307,879.

In a case where such a complex recording apparatus is provided with a manual paper feeding function, if an operation for receiving a facsimile signal is performed in a state where a paper is inserted into a manual paper insertion port, a facsimile image is recorded on the paper manually inserted into the manual paper insertion port. In such the case, if a paper size required for the facsimile image and a paper size of the paper inserted into the manual paper insertion port is not coincident with each other, there is a problem that a portion of the facsimile image becomes not to be recorded on the paper, and therefore, a portion of facsimile image data is missed.

OBJECTS OF THE INVENTION

Therefore, a principal object of the present invention is to provide a novel complex recording apparatus.

Another object of the present invention is to provide a complex recording apparatus in which no facsimile image data is missed.

Another object of the present invention is to provide a complex recording apparatus in which no facsimile image is recorded on a paper inserted into a manual paper insertion port.

SUMMARY OF THE INVENTION

A complex recording apparatus according to the present invention is an apparatus having both a copy machine function and a facsimile machine function, and comprising: a copy image signal outputting means which outputs a copy image signal according to a copy original; a receiving means which receives a facsimile image signal; an image forming means which forms an image on a paper according to one of the copy image signal and the facsimile image signal; an automatic paper supplying means which automatically supplies a paper to the image forming means; a manual paper supplying means which manually supplies a paper to the image forming means; a memory which stores the facsimile image signal; a manual paper supply detecting means which outputs a detection signal when a paper is manually supplied by the manual paper supplying means; and a writing means which writes the facsimile image signal into the memory in response to the detection signal from the manual paper supply detecting means.

When the paper is manually supplied by the manual paper supplying means, since the facsimile image signal is stored in the memory, the facsimile image signal does not become to be missed.

In an aspect of the present invention, the facsimile image signal stored in the memory is recorded on a paper supplied from the automatic paper supplying means by the image forming means when no paper is supplied through the manual paper supplying means.

In another aspect of the present invention, the complex recording apparatus further comprises a paper discharging means which forcedly discharges a paper manually supplied by the manual paper supplying means in response to the detection signal, whereby the facsimile image signal stored in the memory is recorded on a paper supplied from the automatic paper supplying means by the image forming means after the paper manually supplied is forcedly discharged.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flowchart showing one example of an image forming operation according to facsimile image data stored in a RAM; and FIG. 7 is a flowchart showing an operation of another embodiment according to the present invention.

DETAILED DESCRIPTION OF THE PREFERRED EMBODIMENTS

Figure 1:
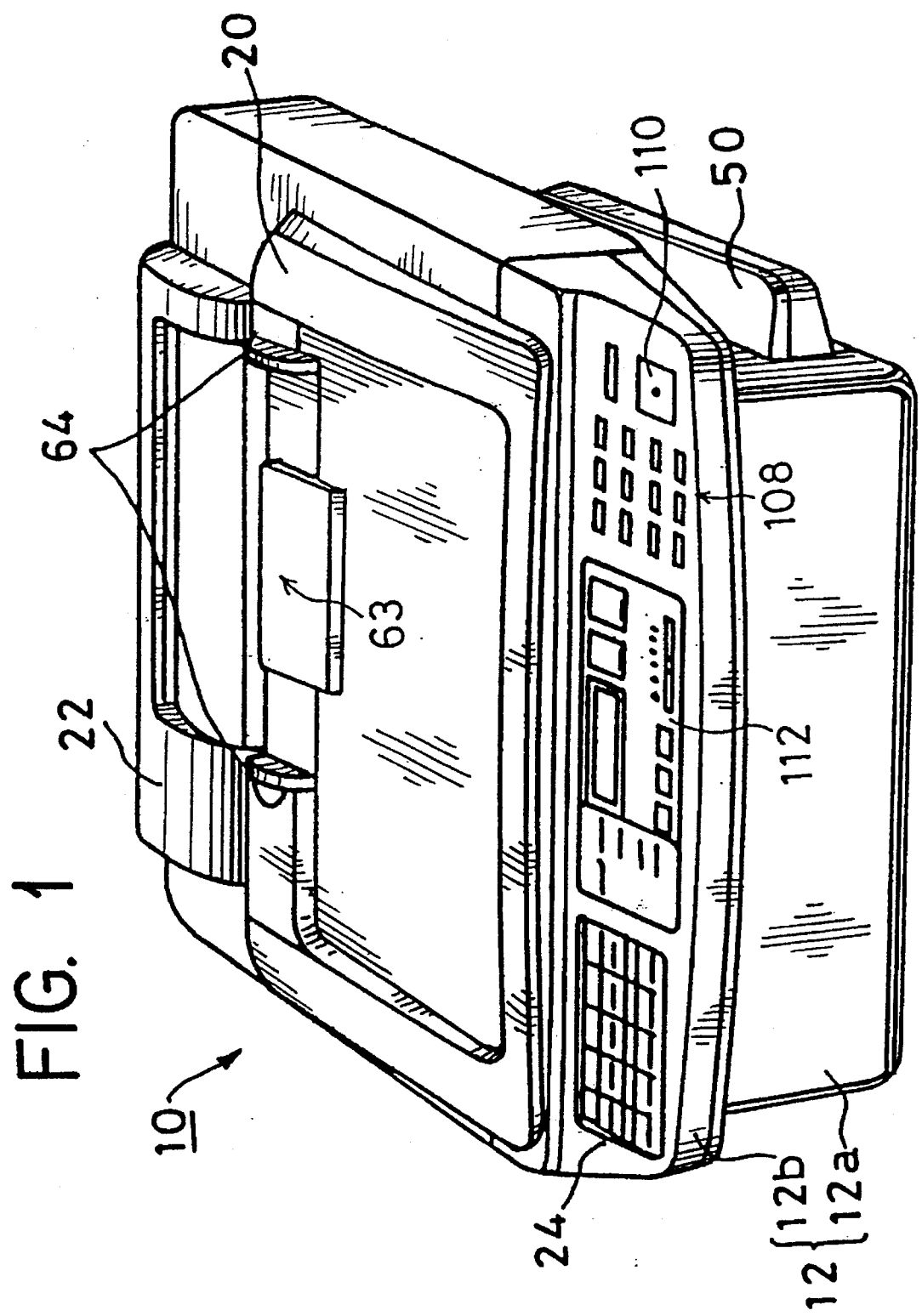
FIG. 1 is a perspective view showing one embodiment according to the present invention.
Figure 2:
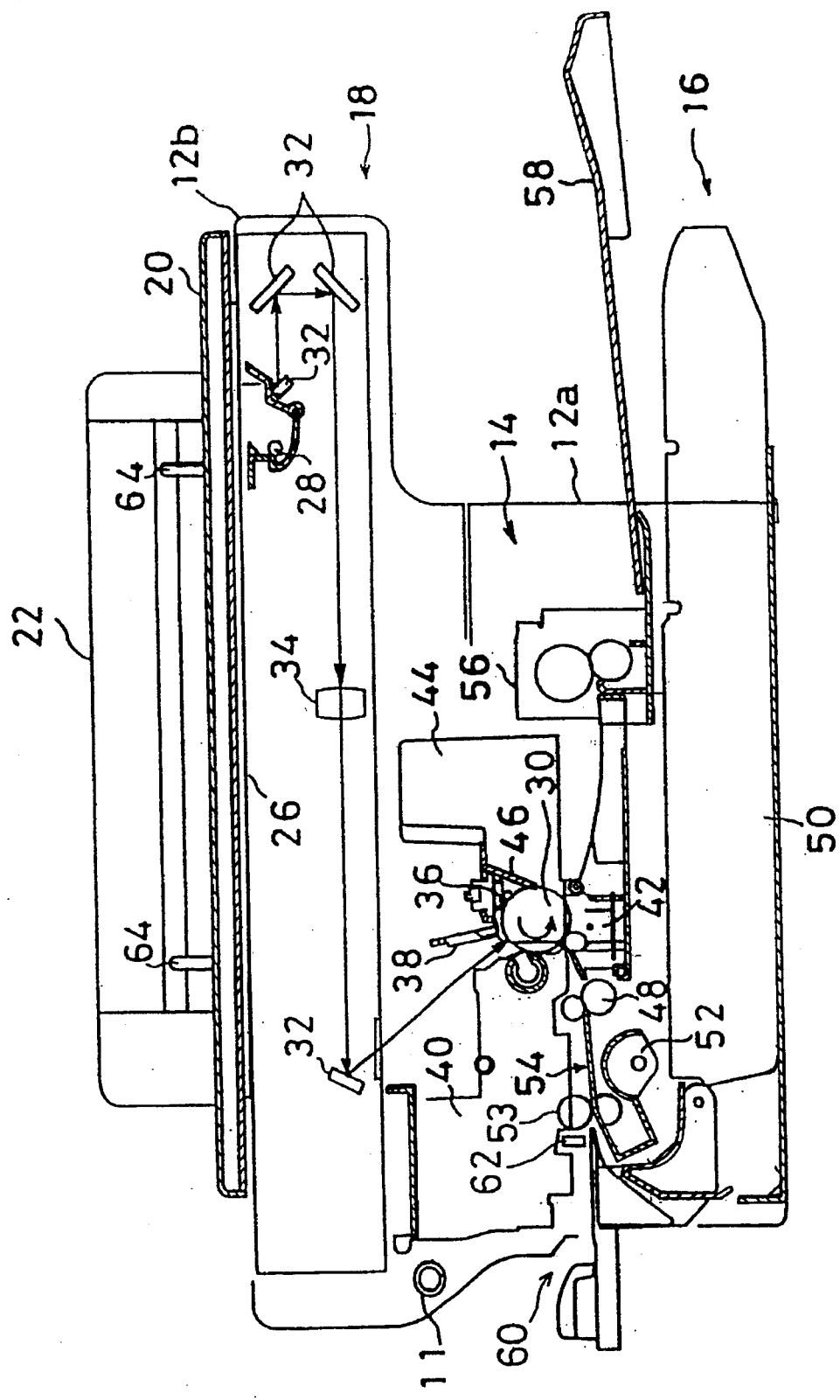
FIG. 2 is an illustrative view showing internal structure of the FIG. 1 embodiment.
Figure 3:
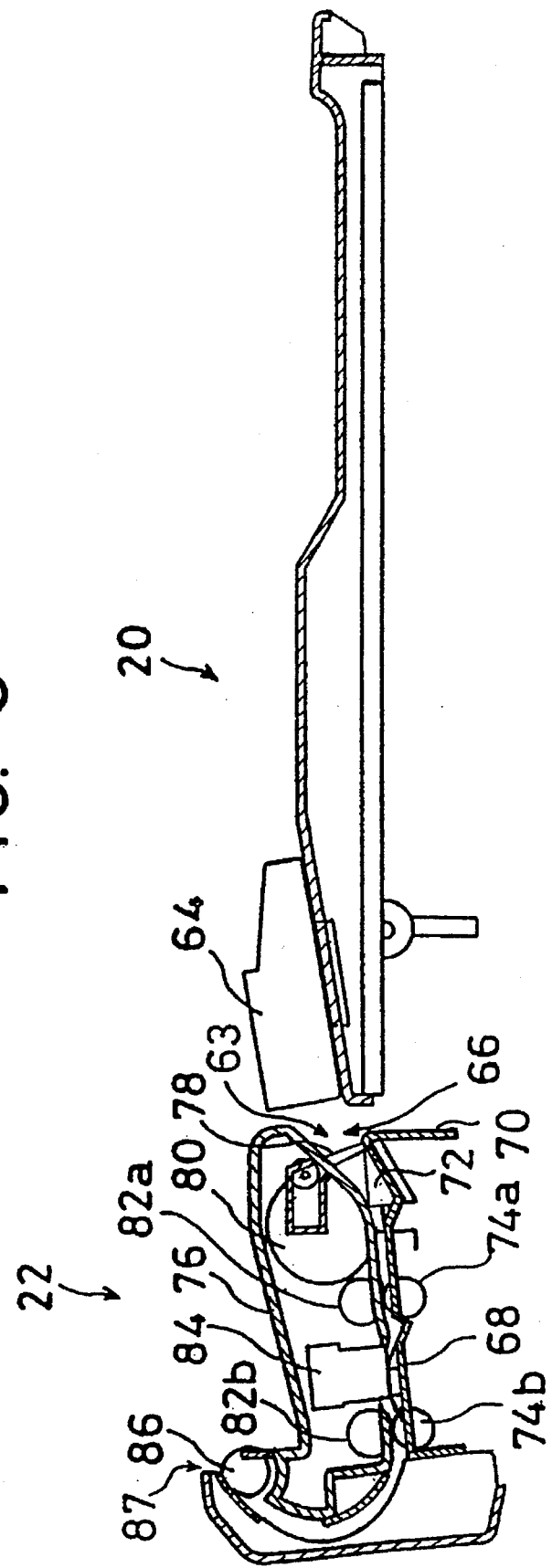
FIG. 3 is an illustrative view showing a platen cover and a digital optical system.

A complex recording apparatus 10 of this embodiment shown in FIG. 1 to FIG. 3 includes a housing 12 which is of a clam-shell type and divided in an upper direction and a lower direction with a fulcrum of a hinge portion 11 (FIG. 2). An image forming portion 14 and an automatic paper supplying portion 16 is in a lower housing portion 12a, and in an upper housing portion 12b, there is provided an analog optical system 18. Furthermore, above the analog optical system 18, that is, on an upper surface of the upper housing portion 12b, there are provided a platen cover 20 and a digital optical system 22 both shown in FIG. 3, an operation panel 24 shown in FIG. 1 and FIG. 3, and etc.

The analog optical system 18 (FIG. 2) constituting a copy original reading portion includes a platen glass 26 arranged at an upper portion of the upper housing portion 12b, and below the platen glass 26, there is an exposure lamp 28 for exposing a copy original (not shown) put on the platen glass 26, a plurality of reflection mirrors 32 and a variable power lens 34 for focusing a reflection light, i.e. a copy image signal from the copy original being exposed by the exposure lamp 28 to a photosensitive member 30 (described later), and etc. are arranged at respective predetermined positions.

The image forming unit 14 (FIG. 2) includes a photosensitive member 30 having a photo-conductive layer (not shown) which is formed on an outer most periphery of the photosensitive member 30. Around the photosensitive member 30, a charger 36 for uniformly charging the photosensitive member 30, a light emitting device array 38 which is driven by facsimile image data received by a transmission/reception circuit 88 (FIG. 4: described later), a developer 40 for adhering a toner to an electrostatic latent image formed on an outer surface of the photosensitive member 30, a transfer charger 42 for transferring a toner image from the photosensitive member 30 onto a paper (not shown) supplied to the photosensitive member 30 (as described later), a cleaning unit 44 for removing a toner remaining on the photosensitive member 30, and an eraser 46 for removing a charge remaining on the photosensitive member 30 are arranged around the photosensitive member 30.

When an optical image signal is irradiated from the reflection mirrors 32 or the light emitting device array 38 onto the photosensitive member 30 being uniformly charged by the charger 36, the electrostatic latent image is formed on the photosensitive member 30 according to a photo-conductive characteristic of the photosensitive member 30. Then, the toner is adhered to the electrostatic latent image by the developer 40, and the toner image is transferred onto the paper (not shown) supplied from a register roller 48 by the transfer charger 42.

The automatic paper supplying portion 16 (FIG. 2) includes a paper supplying tray 50 which is detachably attached to an apparatus body, and papers are accommodated in the paper supplying tray 50. A paper supplying roller 52 is provided above an end portion of the paper supplying tray 50, and a paper stocked in the paper supplying tray 50 is fed by the paper supplying roller 52. The paper fed by the paper supplying roller 52 is supplied to the photosensitive member 30 via a paper supplying path 54 and the register roller 48, and the toner image is transferred onto the paper thus supplied to the photosensitive member 30 by the transfer charger 42. Then, the paper having the transferred toner image is fed to a fixing unit 56, and therefore, the toner image is fixed to the paper, and thereafter, the paper is discharged on a paper discharging tray 58.

As seen from FIG. 2, a manual paper supplying port 60 is formed on a side of the housing 12, and the manual paper supplying port 60 is communicated with the above described paper feeding path 54. Therefore, a paper (not shown) manually inserted into the manual paper insertion port 60 is also brought in a position of the transfer charger 42 through the paper feeding path 84. That is, the image forming unit 14 is capable of transferring the toner image formed on the photosensitive member 30 on a paper which is automatically supplied from the paper supplying tray 50 of the automatic paper supplying portion 16 or a paper which is manually supplied from the manual paper insertion port 60.

The manual paper supplying port 60 is provided with a paper sensor 62. The paper sensor 62 is a sensor for detecting whether or not a paper is manually inserted into the manual paper insertion port 60, and outputs a detection signal when the paper is manually inserted into the manual paper supplying port 60. In addition, the paper inserted from the manual paper supplying port 60 is fed by a paper feeding roller 53 arranged at an upstream side of the paper supplying path 54.

The platen cover 20 (FIG. 3) has a function for holding the copy original put on the platen glass 26 (FIG. 2) and interrupting a disturbance light, and a function for guiding a facsimile original (not shown) to the digital optical system 22. The platen cover 20 is attached to an upper surface of the upper housing portion 12b by a hinge portion which is provided at a position separated from a left end edge of the platen cover 20 by a predetermined distance in a manner that the platen cover 20 can be opened or closed.

A hopper 63 for entering the facsimile original to the digital optical system 22 is formed on an upper surface of the platen cover 20, and a pair of paper guides 64 are provided in a manner that the guides 64 sandwiches the hopper 63. The paper guides 64 are supported in a manner that the paper guides 64 can be spaced to or away from a center of an entrance 66 of the digital optical system 22 while keeping the same distance between the center and each of the paper guides 64. Therefore, by bringing the paper guide 64 into contact with both side edges of the facsimile original, it is possible to position a center of the facsimile original at the center of the entrance 66.

The digital optical system 22 (FIG. 3) constituting a facsimile original reading portion includes a fixed casing 68 which is fixed at the upper portion of the upper housing portion 12b. A plate-like original abutting portion 72 to which the facsimile original (not shown) put on the platen cover 20 abuts at a time that the platen cover 20 is opened is formed at an end portion of the fixed casing 68. There are provided with a separating pad 72, pinch rollers 74a and 74b, and etc., at an upper portion of the fixed casing 68. An upper cover 76 is provided above the fixed casing 68 in a manner that the upper cover 76 can be opened or closed. There are provided with an original sensor 78, a paper supplying roller 80, feeding rollers 82a and 82b, a reading head 84, a discharging roller 86, and etc. on the upper cover 76. In addition, as the reading head 84, a head having an LED array for irradiating a light to the original and a CCD sensor array for receiving a reflection light from the facsimile original is utilized. The facsimile original entered from the hopper 63 is discharged at a discharging port 87 through the entrance 66 and rollers 74a, 74b, 80, 82a, 82b and 86.

The operation panel 24 (FIG. 1) is arranged at a front portion of the housing 12 and within a height of an upper surface of the platen glass 26. Therefore, even if the copy original put on the platen cover 20 or the platen glass 26 is slightly projected toward a front direction of the housing 12, the operation panel 24 can not be hidden by the copy original.

Figure 4:
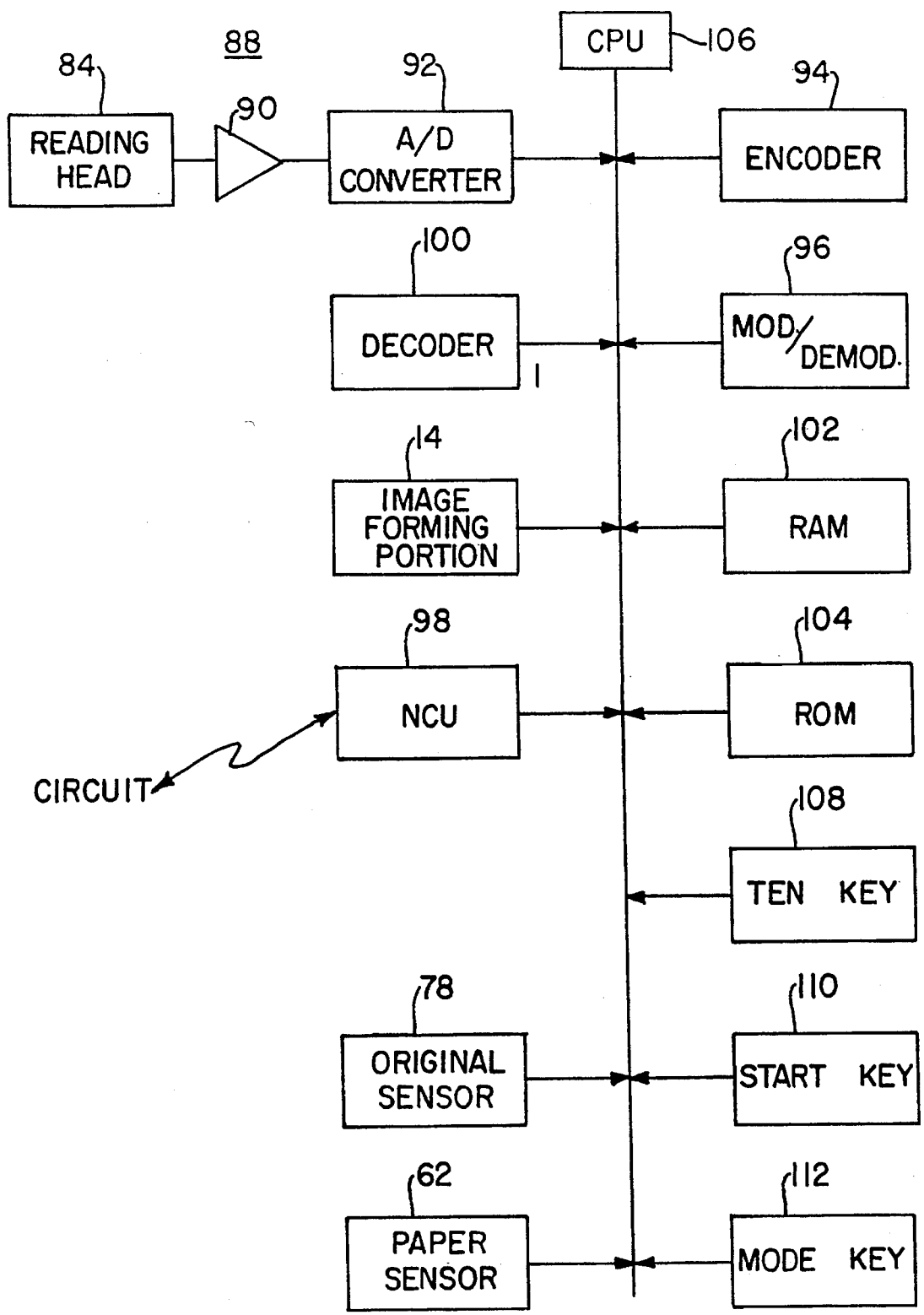
FIG. 4 is a block diagram showing a facsimile transmission/reception circuit.

Furthermore, an electric circuit board (not shown) which holds the transmission/reception circuit 88 for performing a facsimile transmission/reception, etc. is arranged within the housing 12 and below the digital optical system 22. As shown in FIG. 4, the transmission/reception circuit 88 includes an amplifier 90 which amplifies an output of the reading head 84, an A/D converter 92, an encoder circuit 94, a modulation/demodulation circuit 96, an NCU (network control unit) 98, a decoder circuit 100, a RAM 102, a ROM 104, a CPU 106 which controls these components, etc.

In addition, the above described operation panel 24 is provided with a ten-key 108, a start key 110, and a mode key 112 as shown in FIG. 1.

At a time of facsimile transmission, when the original is set in a hopper 63 (FIG. 1) or the mode key 107 is operated, the apparatus is changed into a facsimile mode (facsimile original reading mode). Then, in a case where the apparatus is automatically changed into the facsimile mode by setting the original in the hopper 63, a ten key 108 pad (may be an abbreviated dialing key) is operated to specify an apparatus to be called, and then, by operating a start key 110, a facsimile transmission is started. On the other hand, in a case where the apparatus is changed into the facsimile mode by operating the mode key 112, by setting the original in the hopper 63, and by specifying an apparatus to be called by means of operation of the ten key pad 108 (may be an abbreviated dialing key), and by operating the start key 110, a facsimile transmission is started.

When the start key 110 is operated, at first, an automatic dialer (not shown) is operated, whereby a circuit between the apparatus and the called apparatus is connected by the NCU 98 in accordance with a predetermined protocol. When the circuit connection is recognized or confirmed, and when the original set in the hopper 63 is detected by the original sensor 78, the paper supplying roller 80, the feeding rollers 82a and 82b, and the discharging roller 86 are driven such that the original is supplied to the reading head 84 from the hopper 63 one by one (FIG. 3). The reading head 84 outputs an image signal corresponding to an original image, and this output is amplified by the amplifier 90 and converted into digital image data by the A/D converter 92, and then, encoded by the encoder circuit 94 to compress the data. Then, encoded data from the encoder circuit 94 is modulated to be converted into suitable transmission signal for facsimile communication by the modulation/demodulation circuit 96, and thereafter, outputted to the called apparatus via the NCU 98 and the circuit which has been established. When reading of all of the original has been completely read, a predetermined acknowledgment protocol is performed by the NCU 98, and thereafter, if termination is confirmed, the circuit is opened.

When the apparatus is called by another facsimile apparatus, a predetermined protocol is performed by the NCU 98, whereby a circuit between the apparatus and the calling apparatus is established, and then, reception data is inputted to the modulation/demodulation circuit 96 through the circuit and the NCU 98. The reception data is demodulated by the modulation/demodulation circuit 96, and an output of the modulation/demodulation circuit 96, i.e., the encoded signal is decoded by the decoder circuit 100. An output of the decoder circuit 100, i.e., the image data, is outputted to the image forming portion 14. Therefore, the write emitting device unit 38 is driven in accordance with the facsimile image data, and accordingly, the electrostatic latent image according to the facsimile image data is formed on the photosensitive member 30.

Furthermore, in this embodiment shown, by temporarily storing the facsimile transmission data after modulation in the RAM 102, a function can be performed that the facsimile transmission data is read out at a plurality of times so as to be sent to a plurality of apparatus different from each other, or the facsimile transmission data is sent to the called apparatus at a designated time. Furthermore, by temporarily storing the reception data received during a time that the copying operation is performed in the RAM 102, a function can be performed that after the completion of the copying operation, the image data based on the reception data stored in the RAM is outputted to the image forming portion 14.

In addition, in the ROM 104, a control program for controlling the transmission/reception circuit 88 is stored.

In addition, in a normal facsimile reception operation, a paper having a paper size required for the facsimile image is withdrawn from the paper supplying tray 50, and the paper is fed to the image forming unit 14; however, if a paper is inserted into the manual paper insertion port 60, the operation becomes different from the normal operation.

Next, an operation of a case where the complex recording apparatus 10 is called by another facsimile apparatus (including complex recording apparatus) in a state where a paper is set to the manual paper insertion port 60 will be described by referring FIG. 5 flowchart.

At first, in a step S1, the CPU 106 determines whether or not the facsimile reception is started. If no facsimile reception exists, the facsimile reception is waited for. If the facsimile reception occurs, in a step S2, the CPU 106 performs a reception process. More specifically, in the step S2, the CPU 106 performs a handshake operation with the calling machine, and then, facsimile image data as received is temporarily stored in a buffer memory (a portion of the RAM 102) capable of storing the facsimile image data of at least several pages. A reason why the facsimile image data is temporarily stored in the buffer memory is that it is necessary to perform an output operation of the facsimile image data of one page in synchronization with a rotation of the photosensitive member 30 because the complex recording apparatus 10 of this embodiment shown utilizes an electrophotograph reproduction system.

Next, in a step S3, the CPU 106 determines whether or not a paper is set in the manual paper insertion port 60 on the basis of a signal from the paper sensor 62.

If no paper is set in the manual paper supplying port 60, in a step S4, an image forming operation is performed in parallel with the reception operation in the step S2. More specifically, in step S4, the image forming unit 14 is activated, and the facsimile image data is read from the RAM 102 one by one page in synchronization with the rotation of the photosensitive member 30, and then, the exposure process by the light emitting device unit 38, the developing process by the developer 40, etc. are performed such that the facsimile image can be recorded on a paper supplied from the paper supplying tray 50.

On the other hand, if a paper is set in the manual paper supplying port 60, in a step S5, a memory reception is performed. That is, in the step S5, no above described image forming operation is performed, and the storing of the facsimile image data succeedingly received is continuously performed.

In addition, an operation that the image forming operation is performed on the basis of the facsimile image data stored in the RAM 102 in the step S5 will be described with reference to the FIG. 6 flowchart. In a step S11 of FIG. 6, the CPU 106 determines whether or not the facsimile image data is stored in the RAM 102 in the memory reception operation in the step S5. When the facsimile image data is stored in the RAM 102, in a next step S12, the CPU 106 determines whether or not a paper is set in the manual paper insertion port 60 on the basis of an output of the paper sensor 62.

If the paper is set in the manual paper insertion port 60, the process enters in a stand-by state wherein a command from an operator can be received. For example, if a copy key or switch is depressed by the operator, the paper set to the manual paper insertion port 60 is pulled into the machine, whereby a copying operation by utilizing the analog optical system 18 becomes to be performed. If no paper is set to the manual paper insertion port 60, a paper having a required paper size is withdrawn from the paper supplying tray 50, and therefore, the image forming operation described above is performed in a step S13.

According to the above described embodiment, when the facsimile reception operation is started in a state where a paper is set in a manual paper insertion port 60, the memory reception with utilizing the RAM 102 is continuously performed, and therefore, the inconvenience that the facsimile image is recorded on a paper which is manually supplied from the manual paper supplying port 60 is avoided. Then, the facsimile image data received by the memory reception operation is recorded on a paper supplied from the paper supplying tray 50 at a time that no paper is set to the manual paper insertion port 60, and accordingly, the disadvantage of the prior art that the facsimile image is not completely recorded on the paper due to the difference between a paper size required for the facsimile image and a paper size of the paper manually supplied from the manual paper supplying port 60 can be avoided.

Figure 5:
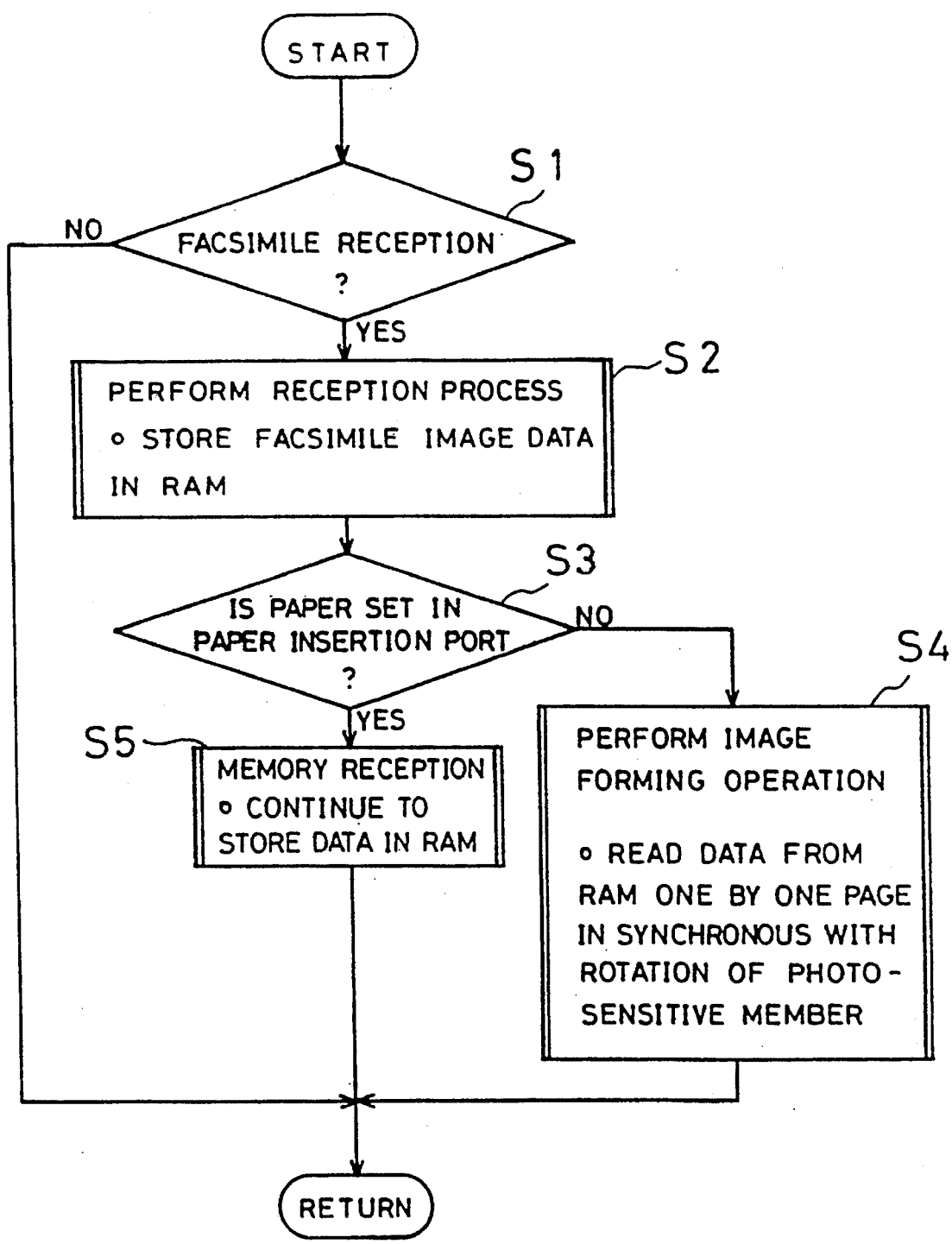
FIG. 5 is a flowchart showing an operation of the embodiment according to the present invention.

FIG. 7 is a flowchart showing another embodiment according to the present invention, and in a first step S21, the CPU 106 determines the presence or absence of the facsimile reception, and then, in a step S22, as similar to the previously described step S2 in FIG. 5, the CPU 106 performs the reception process in a step S22.

Next, in a step S23, the CPU determines whether or not a paper is set in the manual paper insertion port 60 on the basis of the output of the paper sensor 62.

If no paper is set in the manual paper insertion port 60, as similar to the previously described step S4 in FIG. 5, an image forming operation according to the facsimile image data is performed, in a step S25, in parallel with the reception process of the step S22.

On the other hand, if a paper is set in the manual paper insertion port 60, in a step S24, the CPU 106 performs a process for forcedly discharging the paper. More specifically, in the step S24, the image forming unit 18 is not activated, and the paper feeding roller 53, the register roller 48, and etc. are driven such that the paper inserted from the manual paper insertion port 60 is forcedly discharged on the paper discharging tray 58. Thereafter, in a step S25, the image forming operation according to the facsimile image data is performed.

According to FIG. 7 embodiment, when the facsimile reception operation is started in a state where a paper is set in the manual insertion port 60, the paper set in the manual paper insertion port 60 is forcedly discharged, and therefore, the facsimile image is not recorded on the paper manually supplied from the manual paper insertion port 60. Then, after the paper manually supplied is forcedly discharged, as similar to the normal facsimile reception operation, a paper having a paper size required for the facsimile image is withdrawn from the paper supplying tray 50 of the automatic paper supplying portion 16, and then, the facsimile image is recorded on the paper of the required paper size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A complex recording apparatus having a copying machine function and a facsimile machine function, comprising:

a copy image signal outputting means which outputs a copy image signal according to a copy original;

a reception means which receives a facsimile image signal;

a memory for storing a facsimile image signal received by said reception means;

an image forming means which forms an image according to one of said copy image signal and said facsimile image signal;

an automatic paper supply means which automatically supplies a paper to said image forming means;

a manual paper supply means to manually supply a paper to said image forming means;

a manual paper supply detecting means which outputs a detection signal when a paper is present in said manual paper supply means; and a writing means which writes said facsimile image signal received by said reception means into said memory in response to said detection signal.

2. A complex recording apparatus according to claim 1, further comprising means for applying said facsimile image signal written in said memory to said image forming means when no detection signal is outputted to record said facsimile image signal on a paper supplied by said automatic paper supply means.

3. A complex recording apparatus according to claim 2, further comprising a discharging means operable in response to said detection signal for forcedly discharging a paper manually supplied to said manual paper supply means, and means for operating said image forming means to record said facsimile image signal written in said memory on the paper supplied from said automatic paper supply means after the paper is forcedly discharged.

4. A complex recording apparatus having a copying machine function and a facsimile machine function, comprising:

a copy image signal outputting means which outputs a copy image signal according to a copy original;

a reception means which receives a facsimile image signal;

a memory for storing a facsimile image signal received by said reception means;

an image forming means which forms an image according to one of said copy image signal and said facsimile image signal;

an automatic paper supply means which automatically supplies a paper to said image forming means;

a manual paper supply means to manually supply a paper to said image forming means;

a manual paper supply detecting means which outputs a detection signal when a paper is present in said manual paper supply means;

a writing means which writes said facsimile image signal received by said reception means into said memory in response to said detection signal; and a paper discharging means which forcedly discharges said paper present in said manual paper supplying means in response to said detection signal.

5. A control method of a complex recording apparatus having both of a copying machine function and a facsimile machine function, and having a manual paper supply and an automatic paper supply comprising the steps of:

(a) receiving and storing a facsimile image signal into a memory;

(b) determining whether or not a paper is present in the manual paper supply; and (c) continuing to store said facsimile image signal into said memory during the time that it is determined that the paper is present in the manual paper supply in said step (b).

6. A method according to claim 5, further comprising the step of:

(d) performing an image forming operation on a paper supplied by said automatic paper supply according to said facsimile image signal stored in said memory at a time that the presence of no paper in said manual paper supply is determined in said step (b).

7. A method according to claim 6, wherein said step (d) is performed in parallel with said step (a).

8. A control method of a complex recording apparatus having both of a copying machine function and a facsimile machine function, and having a manual paper supply and an automatic paper supply comprising the steps of:

(a) receiving and storing a facsimile image signal into a memory;

(b) determining whether or not a paper is present in the manual paper supply;

(c) forcedly discharging a paper in said manual paper supply at a time that paper is present in said manual paper supply without performing an image forming operation on the discharged paper; and (d) thereafter performing an image forming operation on paper supplied by the automatic paper supply according to said facsimile image read from said memory.

* * * * *